(12) United States Patent
Jenkins et al.

(10) Patent No.: US 9,910,135 B2
(45) Date of Patent: Mar. 6, 2018

(54) FMCW RADAR SELF-TEST

(71) Applicant: Autoliv Development AB, Vårgårda (SE)

(72) Inventors: Alan Jenkins, Allershausen (DE); Jonathan Moss, Haimhausen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 324 days.

(21) Appl. No.: 14/760,821

(22) PCT Filed: Jan. 7, 2014

(86) PCT No.: PCT/SE2014/050009
§ 371 (c)(1),
(2) Date: Jul. 14, 2015

(87) PCT Pub. No.: WO2014/112929
PCT Pub. Date: Jul. 24, 2014

(65) Prior Publication Data
US 2015/0362584 A1    Dec. 17, 2015

(30) Foreign Application Priority Data

Jan. 15, 2013  (EP) .................................... 13151322

(51) Int. Cl.
*G01S 7/40* (2006.01)
*G01S 13/93* (2006.01)

(52) U.S. Cl.
CPC .......... *G01S 7/4056* (2013.01); *G01S 13/931* (2013.01); *G01S 2007/4069* (2013.01)

(58) Field of Classification Search
CPC ........... G01S 13/931; G01S 2007/4069; G01S 7/4056

USPC .................................................. 342/169, 171
See application file for complete search history.

(56) References Cited

U.S. PATENT DOCUMENTS

| | | | |
|---|---|---|---|
| 5,841,393 A * | 11/1998 | Saito ..................... | G01S 7/4056 342/165 |
| 2012/0154232 A1* | 6/2012 | Isom ..................... | H01Q 17/00 343/753 |

FOREIGN PATENT DOCUMENTS

| | | |
|---|---|---|
| DE | 197 44 731 A1 | 5/1999 |
| DE | 10 2010 002 759 A1 | 9/2011 |
| DE | 10 2012 106 501 A1 | 1/2014 |
| EP | 2 336 803 A1 | 12/2010 |
| WO | WO 98/40694 | 9/1998 |

OTHER PUBLICATIONS

PCT International Search Report—dated May 21, 2014.

* cited by examiner

*Primary Examiner* — Timothy A Brainard
(74) *Attorney, Agent, or Firm* — Brinks Gilson & Lione

(57) ABSTRACT

A self-testing method of a frequency-modulated continuous-wave (FMCW) radar device. A transmission signal having an object detection signal and a self-test signal superimposed on the object detection signal is transmitted. The self-test signal represents at least one virtual target. A reception signal is received. The reception signal is a received version of the transmission signal. Presence of the at least one virtual target in the reception signal is determined. A lack of presence of the virtual target in the reception signal provides an indication of hardware failure of the FMCW radar device.

15 Claims, 5 Drawing Sheets

FMCW RADAR SELF-TEST

CROSS REFERENCE TO RELATED APPLICATIONS

This application claims priority to European Patent Application No. 13 151322.8, filed Jan. 15, 2013 and PCT International Patent Application No. PCT/SE2014/050009, filed on Jan. 7, 2014.

FIELD OF THE INVENTION

Embodiments presented herein relate to self-test of a radar device, and particularly to self-test of a frequency-modulated continuous-wave, FMCW, radar device.

BACKGROUND OF THE INVENTION

Various object detection systems have been proposed to warn drivers of the presence of an object in the path of a movable vehicle. Typically, such warning systems provide a suitable warning signal either audible or visual or both, upon a sensor detecting the presence of an object in the path of the moving vehicle.

Single point of failures (SPOFs) inside the sensor hardware are generally not only difficult to detect, SPOFs can also result in false targets or incorrect calculation of target parameters. It is generally considered to be too expensive to replicate the complete hardware chain of the sensor in a parallel, truly redundant way to detect such failures. However, the overall radar detecting system is often required to have more than one radar sensor. This makes it difficult or expensive to realize a high automotive safety integrity level (ASIL) at the hardware stage in a sensor development.

In consideration of the importance of the operability of such object detection systems, it may therefore be desirable for such object detection systems to include self testing capabilities.

According to U.S. Pat. No. 5,432,516 there is provided an object detection system with a self test operation which does not require additional reflecting elements and/or specific positioning of the transmitter and receiver in order to avoid interference caused by preexisting structures on the vehicle, or reliance upon signals reflected from outside the systems such as a ground surface. Further, according to U.S. Pat. No. 5,432,516 when the system is in a self test mode, the controller provides a control signal to a switch so that the object detection signals are provided to a delay unit and thereafter to an auxiliary antenna. Hence the object detection system disclosed in U.S. Pat. No. 5,432,516 requires the use of extra hardware in the form of an auxiliary antenna. Hence, there is still a need for improved self-test of a radar device.

SUMMARY

An object of embodiments of the invention herein is to provide improved self-test of a radar.

According to a first aspect of the invention there is presented a method for self-test of a frequency-modulated continuous-wave, FMCW, radar device. The method comprises transmitting a transmission signal comprising an object detection signal and a self-test signal superimposed on the object detection signal. The self-test signal represents at least one virtual target. The method comprises receiving a reception signal. The reception signal is a received version of the transmission signal. The method comprises determining presence of the at least one virtual target in the reception signal, wherein a lack of presence of said virtual target in the reception signal provides an indication of hardware failure of the FMCW radar device.

According to a second aspect of the invention there is presented a frequency-modulated continuous-wave, FMCW, radar device for self-testing. The FMCW radar device comprises a transmitter arranged to transmit a transmission signal comprising an object detection signal and a self-test signal superimposed on the object detection signal. The self-test signal represents at least one virtual target. The FMCW radar device comprises a receiver arranged to receive a reception signal. The reception signal is a received version of the transmission signal. The FMCW radar device comprises a controller arranged to determine presence of the at least one virtual target in the reception signal, wherein a lack of presence of the virtual target in the reception signal provides an indication of hardware failure of the FMCW radar device.

Advantageously this enables a high ASIL rating of the FMCW radar device to be obtained without requiring advanced hardware. This may also enable the support of a high safety level system functionality with only a single signal processing chain. Advantageously the processing can be performed very quickly and when needed.

It may thereby be possible to insert a test signal from the signal generation part of the system that modulates an FMCW ramp to generate offset sideband frequencies. These can propagate through the transmitter chain, between the transmitter and the receiver, through the receiver chain, into the controller and be processed by part or all of the existing signal processing paths. The self-test signal results in a known pattern generation of artificial virtual targets, the parameters of which are known and can be checked for correct and complete sensor hardware integrity (including hardware induced software errors).

According to a third aspect of the invention there is presented a computer program for self-test of a frequency-modulated continuous-wave, FMCW, radar device, the computer program comprising computer program code which, when run on a FMCW radar device, causes the FMCW radar device to perform a method according to the first aspect.

According to a fourth aspect of the invention there is presented a computer program product comprising a computer program according to the third aspect and a computer readable means on which the computer program is stored. It is to be noted that any feature of the first, second, third and fourth aspects of the invention may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
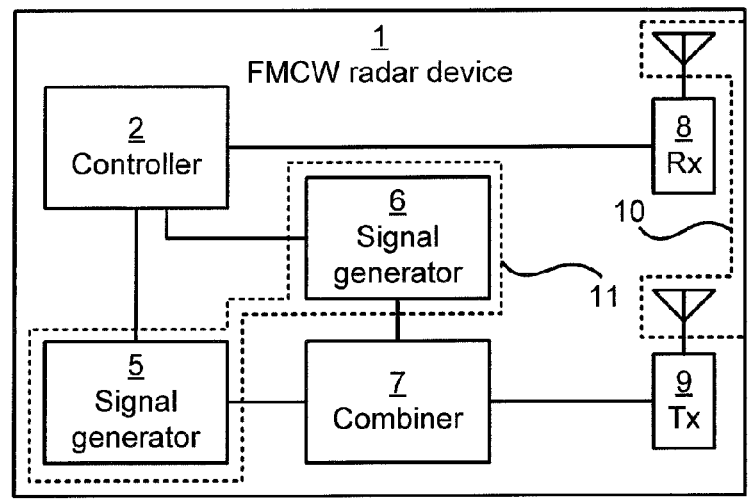
FIG. 1 is a schematic diagram showing functional modules of an FMCW radar device.

FIG. 1 is a schematic diagram showing functional modules of a continuous wave frequency-modulated (FMCW) radar device 1. In general terms, FMCW radar is a short range measuring radar capable of determining distance. The FMCW radar devices provide high reliability by providing distance measurement along with speed measurement. This kind of radar device may be used as an early-warning radar, and/or a proximity sensor. Doppler shift is not always required for detection when FM modulation is used.

The FMCW radar device 1 comprises a controller 2 arranged to control the general operation of the FMCW radar device 1. The controller 2 is operatively connected to a first signal generator 5 and a second signal generator 6. However, according to an embodiment, the FMCW radar device 1 comprises a single signal generator as schematically illustrated at reference numeral 11. The FMCW radar device 1 further comprises a transmitter (Tx) 9. The Tx 9 comprises at least one antenna element. The signal generators 5, 6, 11 are arranged, according to instructions provided by the controller 2, generate signals to be transmitted by the Tx 9. The signals generated by the signal generators 5, 6, 11 are provided to a combiner 7 which is arranged to combine the signals by the signal generators 5, 6, 11 to a common output signal. The combiner 7 is further arranged to provide the common output signal to the Tx 9 for transmission. The FMCW radar device 1 further comprises a receiver (Rx) 8. The Rx 8 comprises at least one antenna element. The Rx 8 is arranged to receive signals and to provide the received signal to the controller 2. The controller 2 is therefore arranged to process received signals. As will be further disclosed below, this arrangement of functional modules enables measurement of the range of the object reflecting the signals by the controller 2. The antenna elements of the Tx 9 and Rx 8 may be provided in a radome 10 of the MCW radar device 1.

General operations of the FMCW radar device 1 will now be described. In an FMCW radar device 1, a radio frequency (RF) object detection signal, frequency modulated with a given modulation waveform, is transmitted by the Tx 9 towards a target and reflected therefrom back to the FMCW radar device 1 for reception by the Rx 8. The reflected signal as received at the Rx 8 is delayed in time, and hence shifted in frequency, from the instantaneous object detection signal by an amount τ proportional to the range R of the target. The range R corresponds to the length-wise distance from the FMCW radar device 1 to the target.

The signal generators 5, 6, 11 are arranged to generate a signal of a known stable frequency continuous wave which varies (up and/or down) in frequency over a fixed period of time by means of a modulating signal. Frequency deviation on the received signal at the Rx 8 increases with distance. The Frequency deviation smears out, or blurs, the Doppler signal. Echoes from a target are then mixes with the transmitted signal to produce a beat signal which will give the distance of the target after demodulation.

A variety of modulations are possible; the transmitter frequency can slew up and down according to a sine wave, a sawtooth wave, a triangle wave, a square wave, and the like. For example, when the object detection signal is modulated by a triangular wave form having a peak to peak value of $\Delta F$ and a period of $1/f_m$, the frequency shift, or difference frequency $f_R$, also commonly known as the beat frequency, as generated by a suitable filtered mixer receptive of the reflected signal and a signal indicative of the object detection signal, is equal to the time derivative of the frequency of the object detection signal times the round trip time delay, τ, and may thus be expressed as $f_R=df/dt \cdot \tau=4R(\Delta F \cdot f_m)/c$, where c is the speed of light. Therefore, the range, R, or distance between the target and the FMCW radar device 1 and, additionally, the range rate of the target relative to the FMCW radar device 1 is determined by the measurement of the frequency shift $f_R$. The process by which the range is determined is as such well known in the art.

Figure 5:
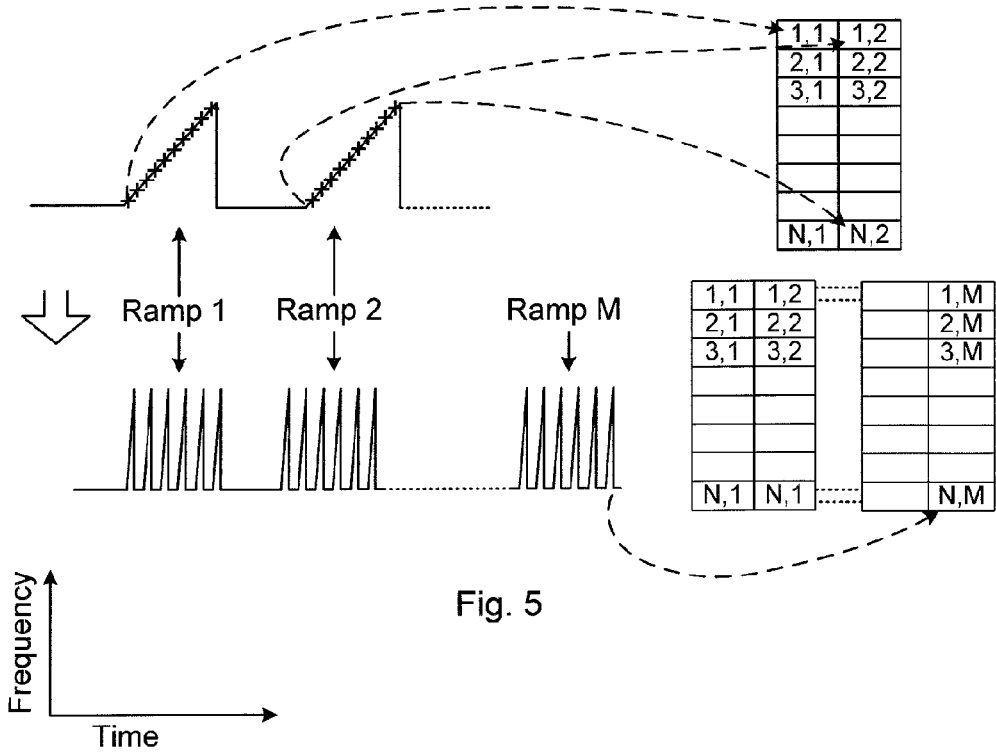
FIG. 5 schematically illustrates a frequency/time structure for a 2D FMCW waveform.
Figure 6:
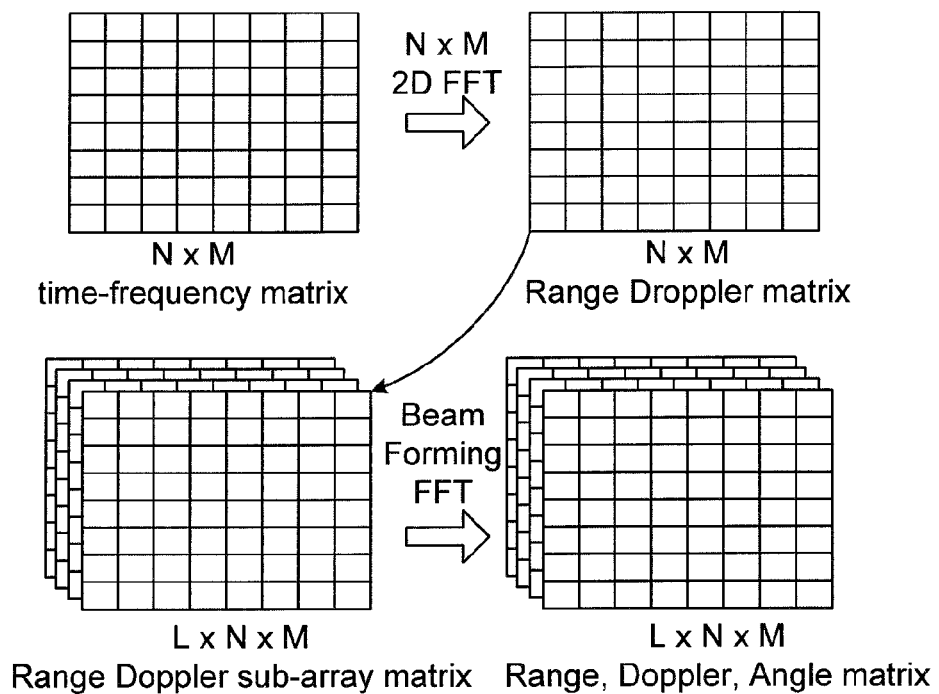
FIG. 6 schematically illustrates matrix processing.

FIG. 5 illustrates the frequency/time structure for a 2D FMCW waveform. The frequency/time structure may be represented as an M×N frequency-time matrix. Illustrated in FIG. 5 is the basic principle of operation of the FMCW radar device 1 using fast, sampled ramps. During the transmit ramp (shown as an up-chirp), the FMCW radar device 1 mixes the received signal with the locally generated ramp. Time delayed signals and Doppler exhibit themselves as frequency shifts or components on the received signal. FIG. 6 schematically illustrates matrix processing to transform from a time-frequency representation (top left) to a range and Doppler representation (top right) using a 2D fast Fourier transform (FFT). Also shown by way of example is further signal processing that is often carried out on the resulting range-Doppler matrix for illustration. A matrix of elements from different sub-array elements can then be combined (bottom left) to an L×N×M Doppler sub-array matrix. Further signal processing such as FFT based beam forming may then be performed on the Doppler sub-array matrix, resulting in a L×M×N range, Doppler, angle matrix representation (bottom right). For one ramp, the frequency offset between the ramp and the received echo translates to a Range/Doppler representation after applying a first FFT processing step. In general, Doppler and range can then be unambiguously resolved by taking multiple ramps and applying a second FFT processing step across the Doppler dimension (i.e., across the ramps).

The embodiments disclosed herein relate to self-test of the FMCW radar device 1. In order to obtain self-test of the FMCW radar device 1 there is provided an FMCW radar device 1, a method performed by the FMCW radar device 1, a computer program comprising code, for example in the form of a computer program product, that when run on an FMCW radar device 1, causes the self-test of the FMCW radar device 1 to perform the method.

Figure 2:
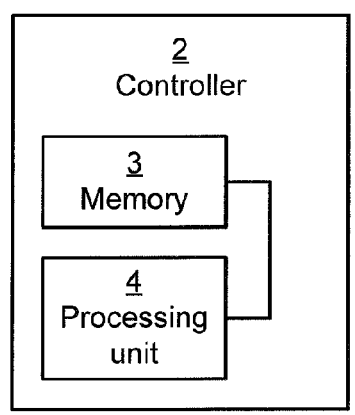
FIG. 2 is a schematic diagram showing functional modules of controller.

FIG. 2 schematically illustrates, in terms of a number of functional modules, the components of the controller 2 shown as a functional block of the FMCW radar device 1 illustrated in FIG. 1. A processing unit 4 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 12 (as in FIG. 4), e.g. in the form of a memory 3. Thus the processing unit 4 is thereby arranged to execute methods as herein disclosed. The memory 3 may also comprise persistent storage, which, for example, can be any single one or combination of magnetic memory, optical memory, solid state memory or even remotely mounted memory. The controller 2 controls the general operation of the FMCW radar device 1, e.g. by sending control signals to the signal generators 5, 6, 11 and receiving signals from the Rx 8. Other components, as well as the related functionality, of the controller 2 are omitted in order not to obscure the concepts presented herein.

Figure 4:
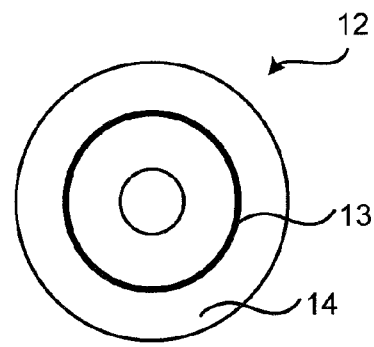
FIG. 4 shows one example of a computer program product comprising computer readable means.
Figures 10, 11:
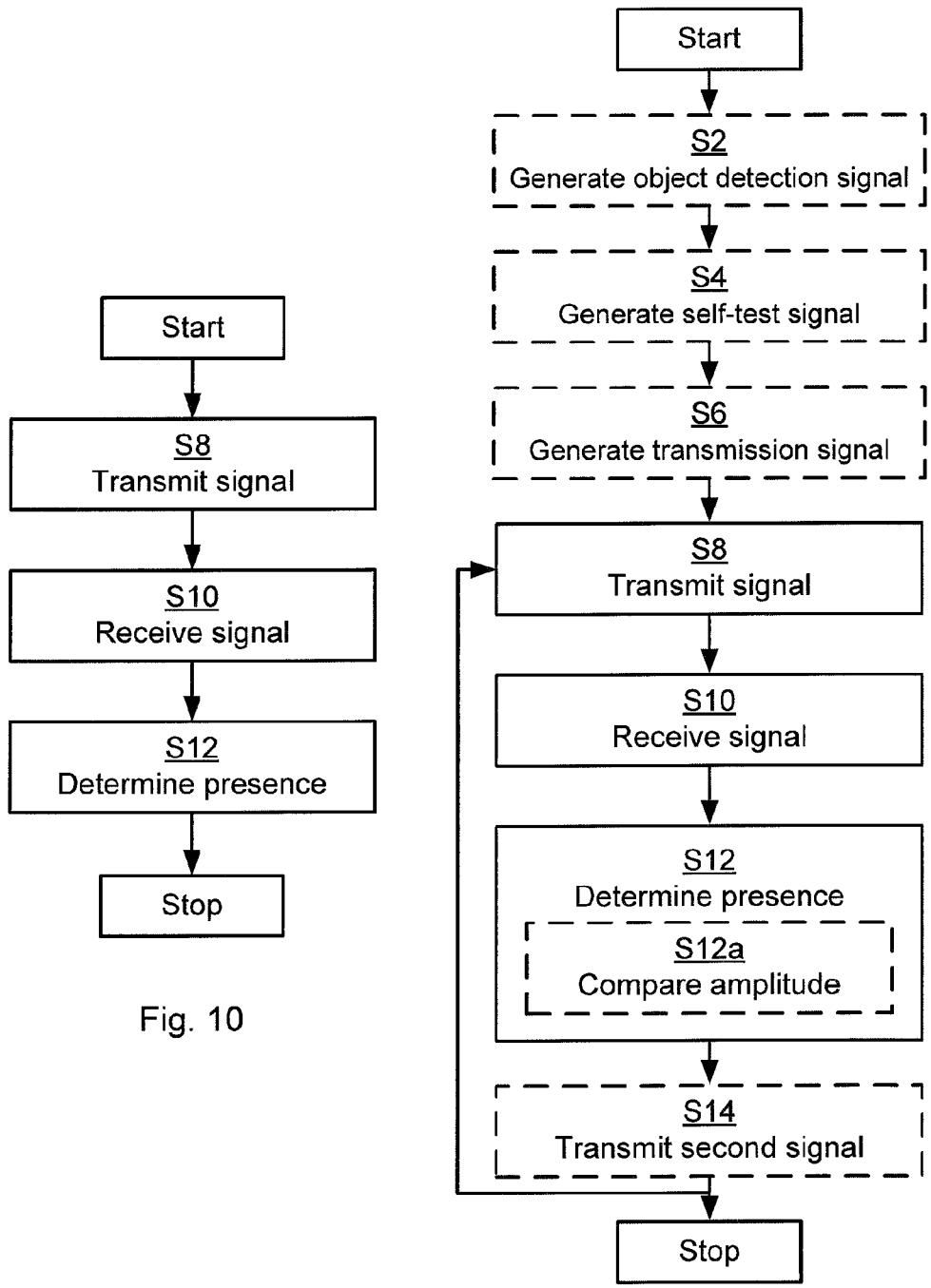
FIGS. 10 and 11 are flowcharts of methods according to embodiments.

FIGS. 10 and 11 are flow charts illustrating embodiments of methods for self-test of an FMCW radar device 1. The methods are performed by the FMCW radar device 1. The methods are advantageously provided as computer programs 13. FIG. 4 shows one example of a computer program product 12 comprising computer readable means 14. On this computer readable means 14, a computer program 13 can be stored, which computer program 13 can cause the controller 2 and thereto operatively coupled entities and devices to execute methods according to embodiments described herein. In the example of FIG. 4, the computer program product 12 is illustrated as an optical disc, such as a CD (compact disc) or a DVD (digital versatile disc) or a Blu-Ray disc. The computer program product 12 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 13 is here schematically shown as a track on the depicted optical disk, the computer program 13 can be stored in any way which is suitable for the computer program product 12.

Figure 7:
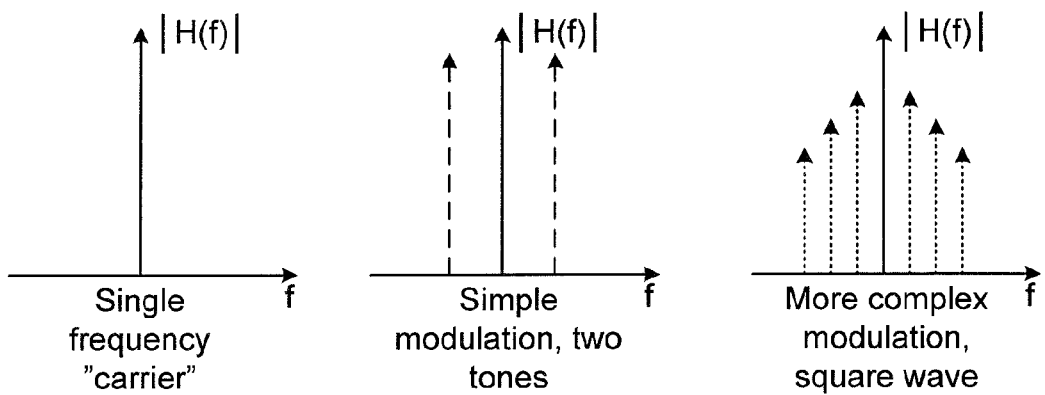
FIG. 7 schematically illustrates frequency components of a transmission signal.

The enclosed embodiments are based on the understanding that a self-test signal, parallel to the object detection signal, is generated by the FMCW radar device 1. On the transmitter side, a modulating signal representing the self-test signal may be generated onto the transmitted ramp representing the object detection signal. This would impart offset frequency components (side bands etc.) onto the main carrier of the object detection signal, as illustrated in FIG. 7, and then hence onto the FMCW ramp signal. As schematically illustrated in FIG. 7 a single carrier frequency (left part) can have two or more side bands (or offset frequencies) representing the self-test signal imposed on it (middle part and right part) using common modulation techniques. The main carrier can then be ramped (swept in frequency) as disclosed with reference to FIG. 5 and the offset modulation tones will sweep also at a fixed offset to the main carrier.

A method for self-test of a frequency-modulated continuous-wave, FMCW, radar device 1 thus comprises, in a step S8, transmitting a transmission signal comprising an object detection signal and a self-test signal. The self-test signal represents at least one virtual target. The self-test signal is superimposed on the object detection signal. The transmission signal is transmitted by the Tx 9 of the FMCW radar device 1.

There may be different ways of generating the transmission signal. According to an embodiment the transmission signal is generated as follows. In a step S2 the object detection signal is generated. The object detection signal may be generated by the signal generator 5. In a step S4 the self-test signal is generated from at least two frequency shifted versions of the object detection signal. The self-test signal may be generated by the signal generator 6. Phase shift keying may be utilized to generate the self-test signal. In general terms, the self-test signal may be based on phase shift keying modulation in the Tx path, amplitude modulation using switches (or turning the Tx side on and off) coded pulses or any other modulation scheme. In a step S6 the transmission signal is generated by adding the self-test signal to the object detection signal. The transmission signal may be generated by the combiner 7. According to an embodiment steps S2, S4 and S6 are performed prior to step S8. According to an embodiment steps S2, S4 and S6 are performed during a pre-configuration phase of the FMCW radar device 1. The object detection signal and/or the self-test signal may then be stored in the memory 3 of the controller 2. Either the full signal waveforms are stored in the memory 3 or just the parameters needed to generate the signal waveforms are stored in the memory 3.

The transmission signal is received by the FMCW radar device 1 as a reception signal. The Rx 8 of the FMCW radar device 1 is therefore arranged to, in a step S8, receive a reception signal being a received version of the transmission signal. The reception signal may, for example, be received either by direct coupling between the Tx 9 and the Rx 8 or by close in reflections due to a radome 10 or close objects. That is, according to an embodiment, the reception signal is received from a direct coupling between the transmitter Tx 9 of the transmission signal and the receiver Rx 8 of the receiver signal. According to an embodiment, the reception signal is received from device internal reflection, such as in a radome 10 of the FMCW radar device 1. According to an embodiment, the reception signal is received from device external reflection.

Figure 8:
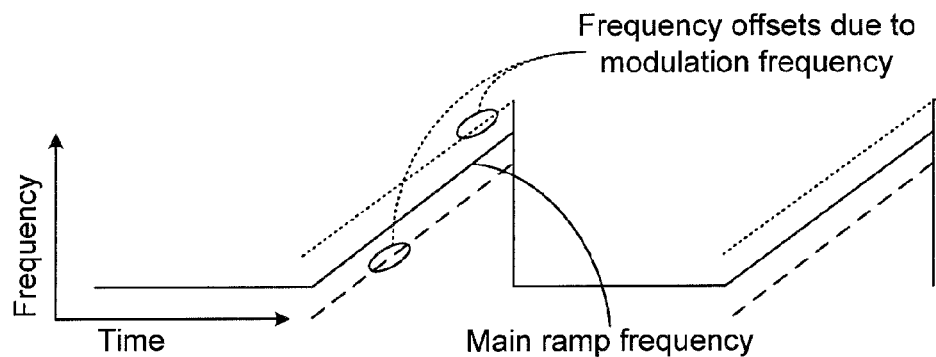
FIG. 8 schematically illustrates main ramp frequency and offset "side bands" due to modulating test tone frequency.

When the reception signal is processed in a normal way by the controller 2 (i.e. as a normal reception signal) performing FFT1 processing, the constant frequency offset shows up as a single (deterministic) signal in a single range gate. This representation then defines the test pattern representing the virtual target. In more detail, FIG. 8 illustrates the main ramp frequency and offset "side bands" due to the modulating test tone frequency. Shown here is two tone modulation (which generate two offset ramps). The controller 2 is therefore arranged to, in a step S12, determine presence of the at least one virtual target in the reception signal. A lack of presence of the virtual target in the reception signal provides an indication of hardware failure of the FMCW radar device 1.

The modulating frequency and waveform may thus generate a particular range/Doppler pattern of virtual targets that can be determined directly from the modulating parameters. Particular range and/or Doppler bins can be examined to see if they contain the required virtual targets. For example, if the correct pattern of virtual targets does not appear whilst the test modulation is executed it is likely that there is a hardware fault in at least one of the Tx 9, Rx 8 and the signal processing chain of the FMCW radar device 1.

Figure 9:
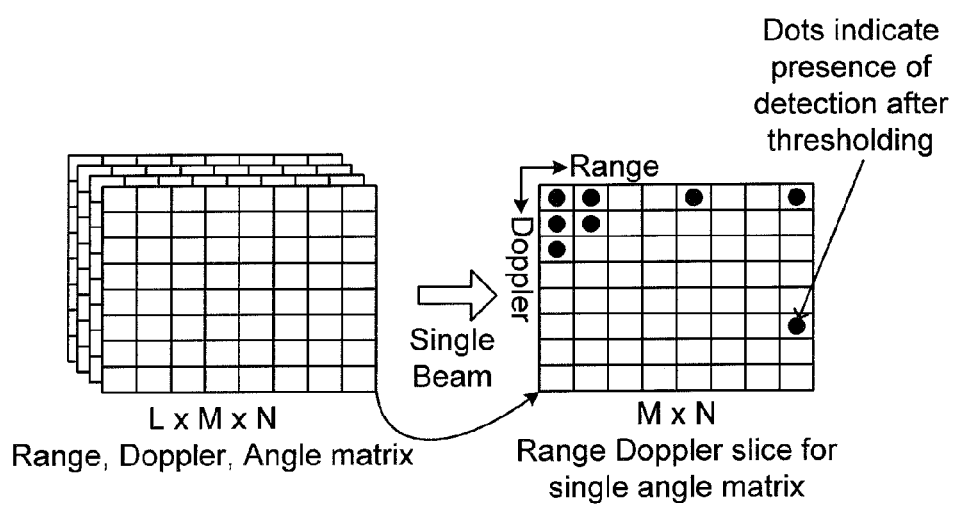
FIG. 9 schematically illustrates frequency offset and phase relation of the modulating reference signal.

Determining presence of the at least one virtual target may therefore comprise, in a step S12a, comparing an amplitude of at least one frequency component in the reception signal to a detection threshold. The step S12a of comparing is performed by the controller 2 of the FMCW radar device 1. The at least one frequency component has at least one location in frequency corresponding to that of the at least one virtual target in the self-test signal. Each frequency component of the self-test signal may therefore correspond to a unique virtual target. Each unique virtual target may correspond to a unique angle, Doppler shift, and/or distance. FIG. 9 illustrates how the frequency offset and phase relation of the modulating reference signal shows up as a deterministic pattern of virtual targets in the range-Doppler space. This is also true after beam forming. Thus, each one of the at least one location in frequency corresponds to a range bin and/or a Doppler bin.

Furthermore, the amplitude of the at least one frequency component being lower than the detection threshold provides the indication of hardware failure. There may be different ways to determine the detection threshold. According to an embodiment the detection threshold takes a fixed value. According to another embodiment the detection threshold takes a value which is dependent on amplitudes of other frequency components in the reception signal. Thereby the detection threshold may be adapted to noise levels of the reception signal.

In general terms, the frequency spacing of the tones (therefore the range bin they appear in) is determined by the modulating waveform. There may also be an amplitude relationship between these tones (for example, the tones should all be relative to one another). This may provide further information about the fidelity of the analogue and digital signal processing chain (for example how it is behaving as a function of frequency). According to embodiments the self-test signal therefore comprises at least two positive frequency components, each corresponding to a tone. The frequency spacing between the tones may be determined by the modulating waveform of the object detection signal.

In general terms the step of transmitting the transmission signal comprising the self-test signal is performed in accordance with the functional safety and reliability requirements of the FMCW radar device 1. The Tx 9 may therefore be arranged to, in a step S14, transmit a second transmission signal from which the self-test signal is excluded. The transmission signal comprising the self-test signal may then be transmitted at the end of each sensor cycle and/or at power up of the FMCW radar device 1. The number of transmissions of the transmission signal comprising the self-test signal may depend on when the transmission signal comprising the self-test signal is transmitted. For example, during power up of the FMCW radar device 1 a larger number of transmissions of the transmission signal comprising the self-test signal may be transmitted in comparison to transmissions of the transmission signal comprising the self-test signal at the end of a sensor cycle.

Thereby transmissions of the transmission signal comprising the self-test signal during power up may represent more comprehensive transmissions of the transmission signal comprising the self-test signal. According to an embodiment the step of transmitting the transmission signal comprising the self-test signal is performed at least during start-up of the FMCW radar device, once every I:th transmission of the second transmission signal, where I≥1, and/or once every J:th millisecond during operation of the FMCW radar device, where J≥1. According to one embodiment the step of transmitting the transmission signal comprising the self-test signal is performed 25 times per second.

Figure 3:
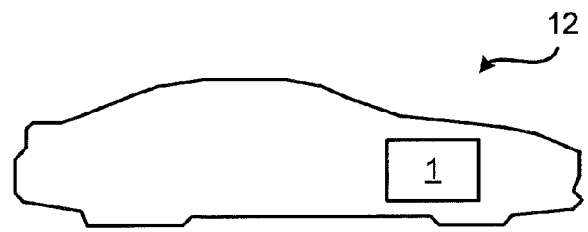
FIG. 3 is a schematic diagram showing functional modules of a vehicle.

The FMCW radar device 1 may be part of a radar arrangement for automotive radars, such as a 77 GHz FMCW radar arrangement. Particularly, the FMCW radar device 1 may be provided in an automotive vehicle 12. FIG. 3 illustrates an automotive vehicle 12 comprising an FMCW radar device 1.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for self-test of a frequency-modulated continuous-wave, (FMCW), radar device, comprising:
   transmitting a transmission signal comprising an object detection signal and a self-test signal superimposed on the object detection signal, wherein the self-test signal represents at least one virtual target;
   receiving a reception signal, the reception signal being a received version of the transmission signal;
   determining the presence of the at least one virtual target in the reception signal, wherein a lack of presence of the virtual target in the reception signal provides an indication of a hardware failure of the FMCW radar device; and
   determining the presence step comprises:
      comparing an amplitude of at least one frequency component in the reception signal to a detection threshold,
      wherein the at least one frequency component has at least one location in frequency corresponding to that of the at least one virtual target in the self-test signal, and
      wherein the amplitude of at least one frequency component being lower than the detection threshold provides the indication of hardware failure.

2. The method according to claim 1 further comprising wherein the detection threshold is a fixed value or is a value dependent on amplitudes of other frequency components in the reception signal.

3. The method according to claim 1 further comprising wherein each one of the at least one location in frequency corresponds to a range bin or a Doppler bin.

4. The method according to claim 1, wherein each frequency component of the self-test signal corresponds to a unique virtual target of the at least one virtual target, the unique virtual target corresponding to a unique angle, Doppler shift, or distance.

5. The method according to claim 1 further comprising, wherein the object detection signal is an up chirp ramp signal.

6. The method according to claim 1 further comprising, wherein the reception signal is received from at least one of a direct coupling between a transmitter of the transmission signal and a receiver of the receiver signal, from device external reflection, or from device internal reflection.

7. The method according to claim 6 further comprising the device internal reflection occurring in a radome of the FMCW radar device.

8. The method according to claim 1, further comprising:
   transmitting a second transmission signal from which the self-test signal is excluded, and
   wherein the step of transmitting the transmission signal comprising the self-test signal is performed at least during start-up of the FMCW radar device, once every I:th transmission of the second transmission signal, where I≥1, or once every J:th millisecond during operation of the FMCW radar device, where J≥1.

9. A method for self-test of a frequency-modulated continuous-wave, (FMCW), radar device, comprising:
   transmitting a transmission signal comprising an object detection signal and a self-test signal superimposed on the object detection signal, wherein the self-test signal represents at least one virtual target;
   receiving a reception signal, the reception signal being a received version of the transmission signal;
   determining the presence of the at least one virtual target in the reception signal, wherein a lack of presence of the virtual target in the reception signal provides an indication of a hardware failure of the FMCW radar device; and
   wherein the self-test signal comprises at least two positive frequency components, each corresponding to a tone, and wherein the frequency spacing between the tones is determined by a modulating waveform of the object detection signal.

10. A method for self-test of a frequency-modulated continuous-wave, (FMCW), radar device, comprising:
   transmitting a transmission signal comprising an object detection signal and a self-test signal superimposed on the object detection signal, wherein the self-test signal represents at least one virtual target;
   receiving a reception signal, the reception signal being a received version of the transmission signal;
   determining the presence of the at least one virtual target in the reception signal, wherein a lack of presence of the virtual target in the reception signal provides an indication of a hardware failure of the FMCW radar device; and
   prior to transmitting the transmission signal:
      generating the object detection signal;
      generating the self-test signal from at least two frequency shifted versions of the object detection signal, and
      generating the transmission signal by adding the self-test signal to the object detection signal.

11. The method according to claim 10, further comprising wherein phase shift keying is utilized to generate the self-test signal.

12. A frequency-modulated continuous-wave, FMCW, radar device for self-testing, comprising:
   a transmitter arranged to transmit a transmission signal comprising an object detection signal and a self-test signal superimposed on the object detection signal, wherein the self-test signal represents at least one virtual target;
   a receiver arranged to receive a reception signal, the reception signal being a received version of the transmission signal;
   a controller arranged to determine presence of the at least one virtual target in the reception signal, wherein a lack of presence of the virtual target in the reception signal provides an indication of hardware failure of the FMCW radar device; and
   wherein the controller is further arranged to compare an amplitude of at least one frequency component in the reception signal to a detection threshold, wherein the at least one frequency component has at least one location in frequency corresponding to that of the at least one virtual target in the self-test signal, and wherein the amplitude of at least one frequency component being lower than the detection threshold provides the indication of hardware failure.

13. An automotive vehicle further comprising an FMCW radar device according to claim 12.

14. A computer configured to execute a computer program for self-test of a frequency-modulated continuous-wave, FMCW, radar device, the computer program comprising computer program code which, when run on the FMCW radar device, causes the FMCW radar device to:
   transmit a transmission signal comprising an object detection signal and a self-test signal superimposed on the object detection signal, wherein the self-test signal represents at least one virtual target;
   receive a reception signal, the reception signal being a received version of the transmission signal;
   determine presence of the at least one virtual target in the reception signal, wherein a lack of presence of the virtual target in the reception signal provides an indication of hardware failure of the FMCW radar device; and
   compare an amplitude of at least one frequency component in the reception signal to a detection threshold, wherein the at least one frequency component has at least one location in frequency corresponding to that of the at least one virtual target in the self-test signal, and wherein the amplitude of at least one frequency component being lower than the detection threshold provides the indication of hardware failure.

15. The computer according to claim 14, further comprises a computer readable means on which the computer program is stored.

* * * * *